United States Patent [19]

Jones et al.

[11] 3,831,029

[45] Aug. 20, 1974

[54] PYROELECTRIC DEVICE USING LEAD GERMANATE

[75] Inventors: Gordon Robert Jones; Norman Shaw, both of Malvern; Anthony Worswick Vere, Whyteleafe near Caterham, all of England

[73] Assignee: The Secretary of State for Defence in Her Britannic Majesty's Government of the United Kingdom of Great Britain and Northern Ireland, London, England

[22] Filed: July 11, 1973

[21] Appl. No.: 378,099

[30] Foreign Application Priority Data

July 12, 1972 Great Britain .................... 32616/72

[52] U.S. Cl. .................. 250/338, 250/330, 250/333

[51] Int. Cl. .............................................. G01j 5/10

[58] Field of Search ........... 250/330, 332, 333, 336, 250/338; 317/235 AP

[56] References Cited

UNITED STATES PATENTS

| | | | |
|---|---|---|---|
| 3,452,423 | 7/1969 | Webb | 317/235 AP X |
| 3,459,945 | 8/1969 | Astheimer et al. | 250/338 X |
| 3,675,039 | 7/1972 | Boyd et al. | 250/330 X |
| 3,772,518 | 11/1973 | Murayama et al. | 260/330 X |
| 3,774,043 | 11/1973 | Le Carvennec | 250/330 |

OTHER PUBLICATIONS

Some Properties of Gete-Pbte Alloys, by Woolley et al. from Journal of the Electrochemical Society, Jan. 1965, pp. 82, 83, 84.

*Primary Examiner*—Archie R. Borchelt
*Attorney, Agent, or Firm*—Elliott I. Pollock

[57] ABSTRACT

A pyroelectric device includes as its pyroelectric material the material lead germanate, $Pb_5Ge_3O_{11}$. The device may be a single element detector, an array of single element detectors, a laser detector system, a laser heterodyne detector system or a pyroelectric camera tube. The lead germanate may be either single crystal material or polycrystalline material.

12 Claims, 4 Drawing Figures

PYROELECTRIC DEVICE USING LEAD GERMANATE

The present invention is related to pyroelectric devices.

The pyroelectric effect is an effect by which a change in the electric polarization of a particular material, leading to a change in the amount of surface charge on the material, may be produced by changing the temperature of the material. The main applications of the pyroelectric effect are in devices which detect infra-red radiation. There are several types of these devices which are known. The pyroelectric effect has been known for a considerable time, but its applications have only become attractive in recent years. This has been due mainly to the development of new pyroelectric materials, particularly triglycine sulphate (TGS) and its derivatives.

Pyroelectric detection devices do not yet provide the same standard of performance as cooled photoconductive detection devices but they already provide significant advantages in convenience over photoconductive devices. It appears that pyroelectric devices will become more widely used in applications requiring a simple but sensitive detector over a wide spectral range.

It is difficult to define a single figure of merit for the purpose of comparison of pyroelectric materials, but there is a general set of materials requirements which may be followed to achieve useful device performance. These requirements include a high pyroelectric coefficient, a low dielectric constant and a low dielectric loss. The materials which best meet these requirements at present are TGS and its derivatives. This family of compounds has, however, a number of limitations, which mainly include a relatively high water solubility and a low ferroelectric Curie temperature.

According to the present invention there is provided a pyroelectric device including a piece of lead germanate, $Pb_5Ge_3O_{11}$, and electrically connected to the piece, detector means for detecting the pyroelectric charge developed on the piece when the piece is exposed to a change in temperature. The change in temperature may be due to infra-red radiation or it may be a change in a system whose temperature is being monitored. In either case the detector means is the same.

The piece may be a platelet of either single crystal or ceramic lead germanate.

Embodiments of the present invention will be described by way of example with reference to the accompanying drawings, in which:-

Figure 1:
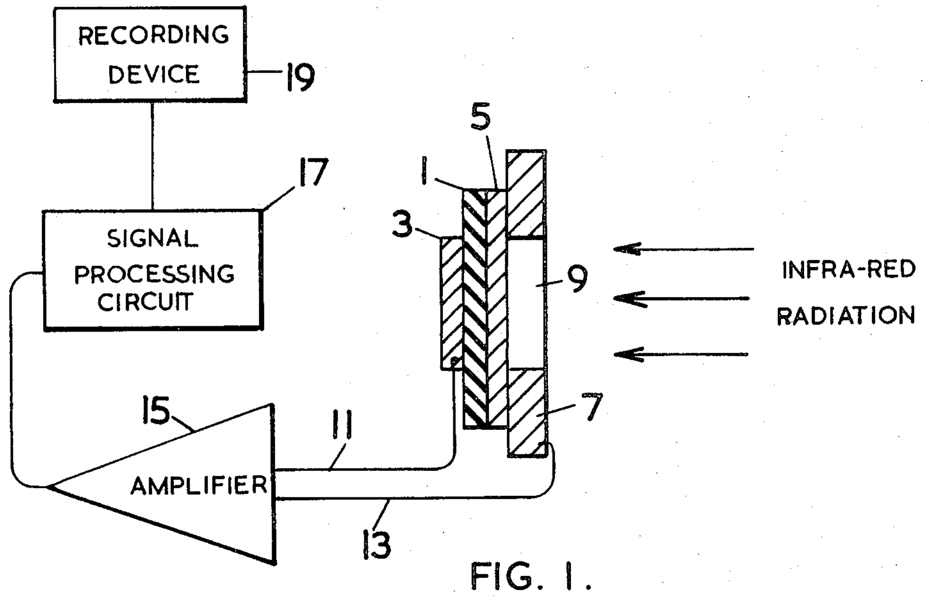
FIG. 1 is a diagram partly in cross-section and partly in schematic circuit form of a single element pyroelectric infra-red radiation detector embodying the present invention.

Lead germanate has a congruent melting point at 740°C, and good optical quality crystals of the material may be prepared by any of the standard growth from the melt techniques. For example, the Czochralski technique may be used. A melt is formed by mixing and then heating in a platinum or gold crucible the correct proportions by weight of lead oxide and germanium dioxide to give the reaction:

$$5PbO + 3\,GeO_2 \rightarrow Pb_5\,Ge_3\,O_{11}$$

The process may be performed in an atmosphere of air, oxygen or argon when a gold crucible is used. Oxygen must be excluded when a platinum crucible is used, otherwise black inclusions occur in the growing crystal. A growth (pulling) rate of about 1mm per hour and a liquid/solid interface temperature gradient of the order of 20°C/mm have been found to be suitable.

Single crystal growth of $Pb_5Ge_3O_{11}$ may also be achieved by the Stockbarger technique using a gold crucible, a growth rate of about 5mm per day and a liquid/solid interface temperature gradient of about 5°C/mm.

Single crystal lead germanate has a yellow-brown colouration and a transmission range from 0.45$\mu$m to 5.0$\mu$m for a sample having a thickness of about 1mm.

Alternatively, ceramic specimens of lead germanate may be prepared by cold pressing at a pressure of about 10 tsi followed by sintering at 700°C for about 12 hours. The microstructure of this material shows an average grain size of 15 to 20 $\mu$m and a porosity of approximately 1 volume per cent.

Hot pressing techniques may be employed to improve the microstructure of the ceramic lead germanate. For instance, uniaxial hot pressing at 680°C with a pressure of 2 tons/per square inch gives grain sizes less than 10$\mu$m and also reduces the porosity.

For a single crystal specimen having a thickness of 63$\mu$m and an area of $3.14 \times 10^{-6} m^2$, parameters relevant to pyroelectric device performance have been measured as follows:

pyroelectric coefficient: $0.95 \times 10^{-8}$C cm$^2$ °K$^{-1}$
dielectric constant at 1,590 Hz : 50
loss tangent at 1,590 Hz : 0.00032
resistivity at 1,590 Hz : $7.0 \times 10^{10}$ ohm-cm For a ceramic specimen having a thickness of 72$\mu$m and an area of $3.14 \times 10^{-6}$m$^2$, the parameters have been measured as follows:

pyroelectric coefficient : $0.5 \times 10^{-8}$C cm$^2$ °K$^{-1}$
dielectric constant at 1,590Hz : 38
loss tangent at 1,590Hz : 0.0024
resistivity at 1,590Hz : $1.2 \times 10^{10}$ In addition, the Curie temperature of lead germanate has been measured as 178°C.

These results indicate that lead germanate in either single crystal or ceramic form is an attractive pyroelectric material.

When the material is newly prepared it contains ferroelectric domains which are randomly orientated and which provide only a small net electric polarization.

In common with some pyroelectric materials lead germanate must be "poled" before it can be used in a device. Poling involves applying a high (between about 10 and about 30 kV per cm) steady electric field across the material so that the domains may be aligned to provide a relatively large electric polarization.

FIG. 1 is a diagram partly in cross-section and partly in schematic circuit form of a single element pyroelectric infra-red radiation detector embodying the present invention. The detector includes a slice 1 of either single crystal or ceramic lead germanate having a thickness less than 100$\mu$m. (If the slice 1 is single crystal it is cut so that its plane is perpendicular to the trigonal "C" axis or axis of polarization of the material). The slice 1 is sandwiched between an opaque electrode 3

(smaller in area than the slice 1) and an electrode 5 transparent to infra-red radiation. The electrode 5 is placed in contact with a conducting mount 7 having a circular aperture 9 concentric with the electrode 3. The electrode 5 and the electrode 3 may for example be made of nichrome (which is semi-transparent) and gold respectively, evaporated on the respective surfaces of the slice 1. A signal lead 11 is attached to the electrode 3 and a signal lead 13 is attached to the electrode 5.

When infra-red radiation is incident via the electrode 5 on the slice 1 a change in the surface charge on the slice 1 occurs by virtue of the pyroelectric effect. The charge is detected by means of the leads 11 and 13 as a voltage or a current, by means of an amplifier 15. The output of the amplifier is processed by a conventional signal processing circuit 17 which is used to extract the signal from noise. The output of the circuit 17 is recorded by a conventional recording device 19.

The amplifier 15 has for the purpose of increased detectivity, a junction field effect transistor (JFET) as its first stage. (For example a Texas Instruments BF 800 JFET which is specially designed for the purpose of pyroelectric detection has been found very useful in this connection). The electrical signal recorded by the recording device may be used to provide a measure of the intensity or the modulation frequency of the detected radiation. Alternatively it may be converted into an optical signal (in the visible range) by means of a suitable electroluminescent medium for visual display.

A detector, similar to that described with reference to FIG. 1, may be used as a temperature sensor in any system requiring its temperature to be monitored very accurately.

Pyroelectric devices can be used in various ways to provide thermal imaging systems. For example a single detector can be used, and the picture can be built up by scanning the infra-red image across it using a conventional two dimensional mechanical scanning system. In this type of arrangement the detector should have a high detectivity and a wide frequency bandwidth if a reasonably fast frame rate is required. Another example of a thermal imaging system uses a row of detectors constituting a one-dimensional television line. The picture is built up with a conventional one dimensional mechanical scan. The detector bandwidth is less than that in the first example by a factor equal to the number of detector elements used in a line. A third example uses a two-dimensional row and column array of detectors, so that no mechanical scanning is necessary. In this case the bandwidth is narrowed again by a factor equal to the number of rows of elements used.

In the first example the element may basically be that described with reference to FIG. 1, i.e., incorporating lead germanate as a pyroelectric detector. In the other two examples, a plurality of elements basically of the type described with reference to FIG. 1 may be used. In each case however each element or each of the elements will be followed conveniently by a single amplifier and processing circuit and an electroluminescent medium for converting the electrical signal generated by that element into an optical signal which can be displayed.

Figure 2:
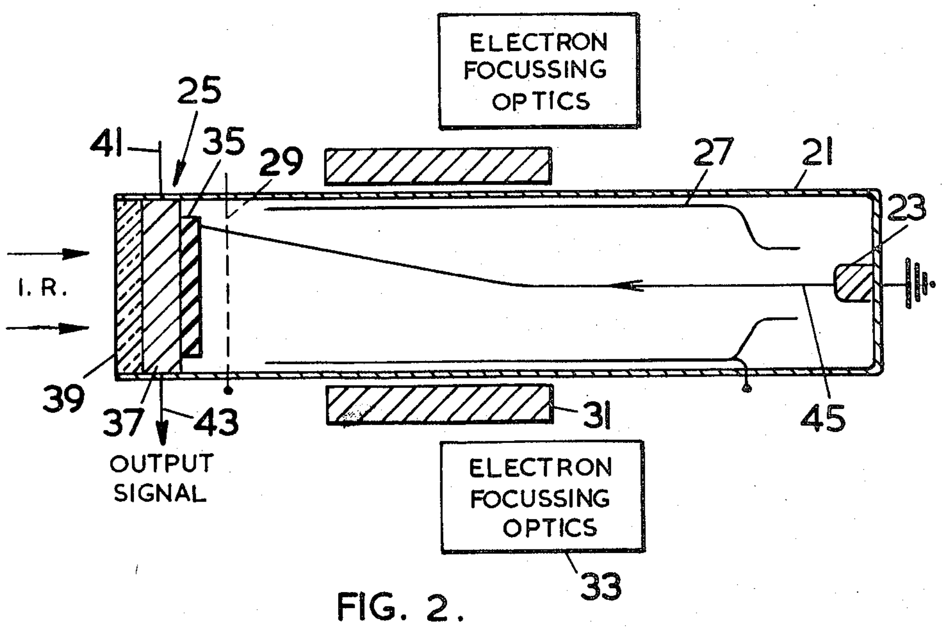
FIG. 2 is a schematic cross-sectional diagram of a pyroelectric camera tube system embodying the present invention.

The pyroelectric effect has another application in a pyroelectric camera tube system. A pyroelectric camera tube is basically the same as a conventional television camera tube but in which the photoconductive target material is replaced by pyroelectric material sensitive to infra-red instead of visible radiation. FIG. 2 is a schematic cross-sectional diagram of a pyroelectric camera tube system embodying the present invention. The camera consists basically of a vacuum tube 21 containing a cathode 23, a target 25, a grid electrode 27 generally coaxial with the tube 21 and a mesh grid electrode 29 in front of the target 25. A deflection system 31 and a conventional electron focussing system 33 are provided on the outside of the tube 21. The target 25 consists of a slice 35 of either single crystal or ceramic lead germanate electrically connected to a layer 37 of material (such as nichrome) which is electrically conducting. The perimeter of the layer 37 is attached to the faceplate of the tube 21 which consists of a layer 39 of an infra-red transmitting glass. Alternatively, the layer 37 can also be the faceplate layer 39 and the slice 35 can be electrically connected to it either by being mounted directly on it or through an intermediate connection (not shown).

The layer 37 is maintained by means of a contact 41 at one side at a stable potential, relative to the potential of the cathode 23. At the other side, the layer 37 is attached to a contact 43 which is used to provide an output signal. The cathode 23 produces an electron beam 45 which is scanned across the surface of the slice 35. Infra-red radiation IR, modulated by a chopper (not shown), is incident (from a given scene) via the layer 39 and the layer 37 on the slice 35. Wherever the layer 35 is irradiated the pyroelectric effect occurs to an extent varying with the intensity of the radiation. Electric charges are produced on the surfaces of the slice 35. The surface charge is quenched as the electron beam 45 is scanned across the surface of the layer 35. Charge then flows in the circuit comprising the layer 37 and the contacts 41 and 43 and may be detected as a signal at the contact 43 which may be processed by conventional signal processing circuits (not shown) and displayed in a known way.

Figure 3:
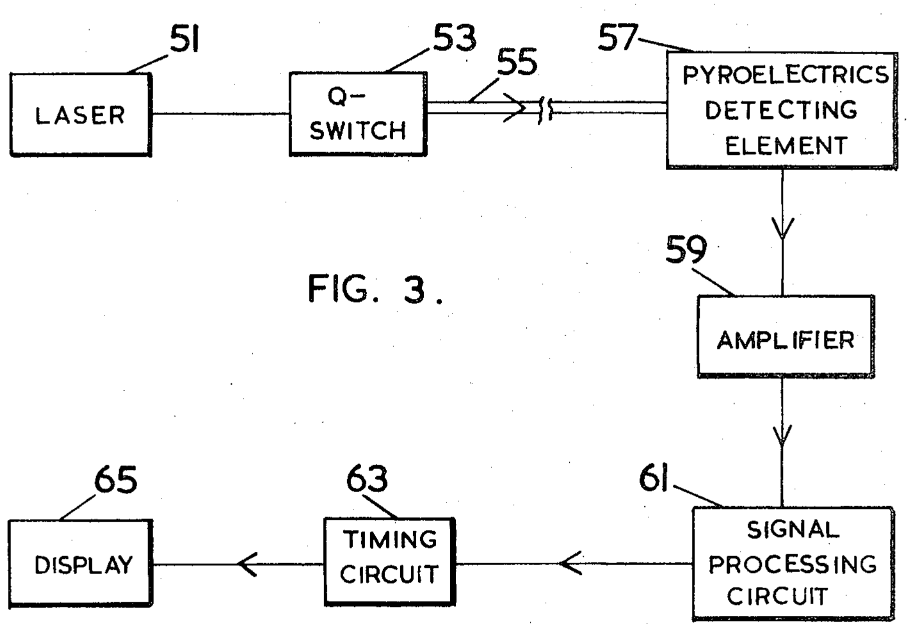
FIG. 3 and FIG. 4 are schematic block diagrams of alternative laser detection arrangements.

Another application of the pyroelectric effect is in the detection of laser radiation, particularly that from a carbon dioxide laser at 10.6$\mu$m. FIG. 3 is a schematic block diagram of a detection system for a pulse laser beam. A laser 51 (such as a carbon dioxide laser) is Q-switched by means of a Q-switch 53. The output of the laser 51 consists of a beam 55 in the form of a series of pulses. The beam 55 is incident on a pyroelectric detecting element 57 similar to that described in FIG. 1, i.e., containing the pyroelectric material lead germanate. The pyroelectric signal generated by the element 57 is amplified by means of an amplifier 59 similar to the amplifier 15 described with reference to FIG. 1. The signal is then extracted from noise in a conventional signal processing circuit 61, and the output of the circuit 61 is fed to a conventional timing circuit 63 which is used to measure the length (in time) of the laser pulses detected by the element 57. The output of the timing circuit 63 may be displayed on a cathode ray tube display 65 (on which the size of the detected pulse may be displayed).

The arrangement described with reference to FIG. 3 can provide a fairly fast and moderately sensitive means of measuring the pulse length of the laser beam 55. Alternatively, if a beam splitter (not shown) is located in the path of the beam 55, and the two resulting beams formed travel along different paths, the arrangement may be used to measure the difference in the time of travel along the two paths. The two beams may be detected both by the element 57 and the amplifier 59. Alternatively one beam may be detected by the element 57 and the amplifier 59 and the other may be detected by a separate (but similar) detector and the amplifier 59. In either case however the output of the timing circuit 63 is used to compare the time of detection of corresponding pulses from the two beams.

Figure 4:
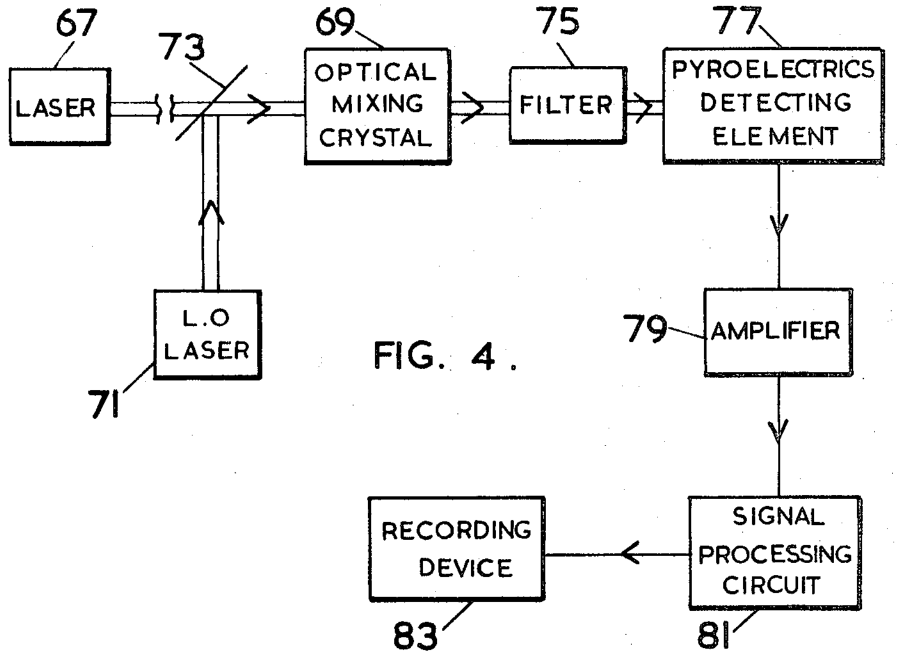

FIG. 4 is schematic block diagram of an alternative laser detection element embodying the invention in a superheterodyne detection arrangement. The radiation from a laser 67 is incident on an optical mixing crystal 69. The radiation from a local oscillator laser 71 is also arranged by means of a beam combiner 73 to be incident on the crystal 69. The radiation from both lasers is mixed at the crystal 69 and the difference frequency generated in the crystal 69 is selected by an optical filter 75 passing only frequencies in the range of the difference frequency. The optical output of the filter 75 is incident on a pyroelectric detector element 77 similar to that described with reference to FIG. 1 (i.e., containing a slice of pyroelectric lead germanate). The output of the element 77 is amplified by an amplifier 79 similar to the amplifier 15 described with reference to FIG. 1. The output of the amplifier 61 is processed by a conventional signal processing circuit 81 which is used to extract the amplified signal from noise, and the output of the circuit 81 is passed to a conventional recording device 83.

A signal having a frequency equal to the difference between the frequencies of the beams from the lasers 67, 71 is isolated by means of the crystal 69 and filter 75, detected by means of the element 77, the amplifier 79 and the circuit 81 and recorded at the recording means 83. The arrangement may be such that the laser 67 and the laser 71 are the same type of laser, but in which the laser 67 is frequency modulated so that the arrangement detects the modulation frequency.

We claim:

1. A pyroelectric radiation detection device comprising a piece of lead germanate and, electrically connected to said piece, detector means for detecting the pyroelectric charge developed on said piece when said piece is exposed to a change in temperature produced by electromagnetic radiation incident on said device.

2. A pyroelectric device as claimed in claim 1 and wherein said piece is a platelet.

3. A pyroelectric device as claimed in claim 1 and wherein said piece of lead germanate is a single crystal.

4. A pyroelectric device as claimed in claim 1 and wherein said piece of lead germanate is in a ceramic polycrystalline form.

5. A pyroelectric device as claimed in claim 1, and wherein said detector means incorporates at least one electrode electrically connected to said piece of lead germanate and a signal processing circuit electrically connected to said electrode.

6. A pyroelectric device as claimed in claim 5 and wherein said detector means includes a first electrode electrically connected to a first surface of the piece of lead germanate and a second electrode electrically connected to a second surface of said piece of lead germanate.

7. A pyroelectric device as claimed in claim 6 and wherein at least one of said electrodes in transparent to infra-red radiation.

8. A pyroelectric imaging system including a pyroelectric device as claimed in claim 7 and means for scanning an infra-red image across different parts of said piece of lead germanate.

9. A pyroelectric imaging system including a row and column matrix of pyroelectric devices each as claimed in claim 7.

10. A pyroelectric laser imaging system including a laser providing an output beam in the near infra-red region of the electromagnetic spectrum and a pyroelectric device as claimed in claim 7 arranged to detect the output beam of the said laser.

11. A pyroelectric laser heterodyne imaging system including a first laser, a second laser having a different frequency, means for mixing the output beam from said first laser with the output beam from said second laser, means for extracting from said beams when mixed a difference frequency signal corresponding to the difference in frequency between said beams and a pyroelectric detector as claimed in claim 1, arranged to detect said difference frequency signal.

12. A pyroelectric device as claimed in claim 5 and wherein said device is a pyroelectric camera tube system and includes means for scanning an electron beam across a surface of the piece of pyroelectric material to enable the pyroelectric charge developed on the piece to be transferred to the said signal processing circuit via the said electrode.

* * * * *